United States Patent

Schellenbaum et al.

[15] 3,689,550
[45] Sept. 5, 1972

[54] N-HYDROXYPHENYL-N'-PHENYLUREAS

[72] Inventors: Max Schellenbaum, Muttenz; Max Duennenberger, Frenkendorf; Fulvio Casagrande, Binningen, all of Switzerland

[73] Assignee: Ciba-Geigy AG, Basel, Switzerland

[22] Filed: March 11, 1969

[21] Appl. No.: 806,302

[30] Foreign Application Priority Data

March 21, 1968 Switzerland ............... 4167/68

[52] U.S. Cl. ............... 260/553 C, 424/322, 162/161, 252/8.75, 252/106, 106/15 R, 117/138.5
[51] Int. Cl. ......................................... C07c 127/16
[58] Field of Search .................................. 260/553 C

[56] References Cited

UNITED STATES PATENTS 2,745,874   5/1956   Shetty et al. ........... 260/553 C
2,867,659   1/1959   Model et al. ............ 260/553 C
3,151,023   9/1964   Martin .................... 260/553 C

FOREIGN PATENTS OR APPLICATIONS

42/6174    9/1966   Japan .................... 260/553 C
1,457,172  9/1966   France .................. 260/553 C

OTHER PUBLICATIONS

Sah et al., Chem. Abstracts, Vol. 43, (1949), col. 7,445– 7,448.

*Primary Examiner*—Leon Zitver
*Assistant Examiner*—Michael W. Glynn
*Attorney*—Harry Goldsmith, Joseph G. Kolodny, Bryant W. Brennan and Edward J. Sites

[57] ABSTRACT

N-hydroxyphenyl-N'-phenylureas useful as active ingredients in preparations for combatting harmful micro-organisms, especially bacteria.

3 Claims, No Drawings

N-HYDROXYPHENYL-N'-PHENYLUREAS

The subject of the invention are N-hydroxyphenyl-N'-phenylureas of formula (I) 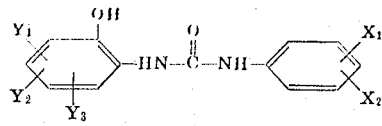

wherein $X_1$ and $X_2$ each denote a trifluoromethyl group, a hydrogen atom or a halogen atom, $Y_1$ represents an alkyl or alkoxy group having at most 12 carbon atoms, a cycloalkyl residue, a phenyl residue, a phenylalkyl residue having one to four carbon atoms in the alkyl residue or a trifluoromethyl group and $Y_2$ and $Y_3$ independently of one another denote hydrogen atoms or alkyl groups having at most 12 carbon atoms if $Y_1$ represents an alkyl group, but denote hydrogen atoms if $Y_1$ represents a different substituent. Amongst the ureas of Formula (I), those in which at least one of the substituents $X_1$, $X_2$ and $Y_1$ denotes a trifluoromethyl group are preferred.

Particularly valuable substances are the N-hydroxyphenyl-N'-phenylureas of formula (II) 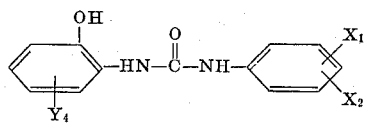

wherein $X_1$ and $X_2$ have the significance mentioned and $Y_4$ denotes an alkyl group having at most 12 carbon atoms, a cycloalkyl or a phenyl group, or a phenylalkyl group with one to four carbon atoms in the alkyl residue.

A very particular interest then attaches to the N-hydroxyphenyl-N'-phenylureas of one of the formulas (III) 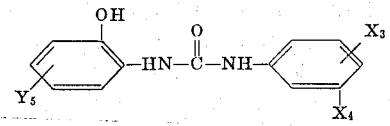

(IV) 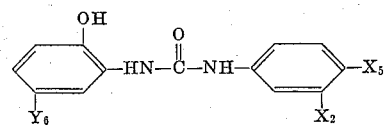

(V) 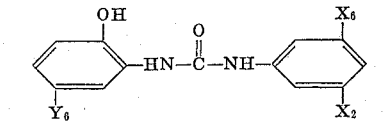

wherein $X_2$ denotes a trifluoromethyl group, a hydrogen atom or a halogen atom, $X_3$ denotes a trifluoromethyl group, a hydrogen atom or a chlorine atom which is in the 4- or 5- position to the —NH— bridge, $X_4$ denotes a halogen atom or a trifluoromethyl group, $X_5$ denotes a hydrogen atom or a halogen atom, $X_6$ denotes a hydrogen atom or a trifluoromethyl group, $Y_5$ denotes an alkyl group having at most 12 carbon atoms, a cyclohexyl group or a phenyl group which is in the 4'-position or 5'-position to the —NH— bridge, and $Y_6$ denotes an alkyl group having at most 12 carbon atoms, a cyclohexyl group, a phenyl group, or a phenylalkyl group with one to four carbon atoms in the alkyl residue.

Amongst the compounds of Formulas (IV) and (V), those of the following formulas are preferred:

(VI) 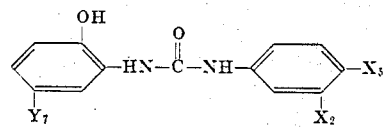

and (VII) 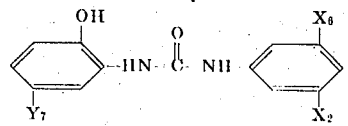

wherein $Y_7$ denotes an alkyl residue with at most 12 carbon atoms and $X_2$ and $X_5$ have the significance mentioned.

Particularly suitable N-hydroxyphenyl-N'-phenylureas correspond to one of the following formulas:

(VIII) 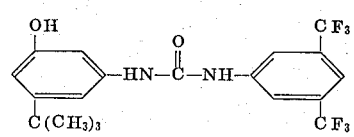

(IX) 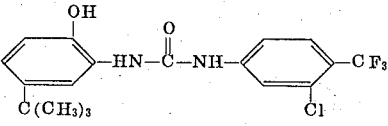

(X) 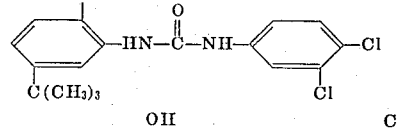

(XI) 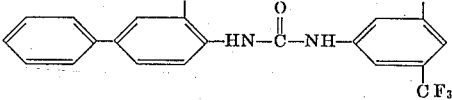

The ureas of Formula (I) can appropriately be manufactured according to methods which are in themselves known, for example by reaction of an o-hydroxyaminobenzene of formula (XII) 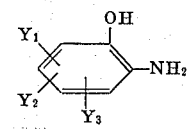

wherein $Y_1$, $Y_2$ and $Y_3$ have the significance mentioned, with a phenylisocyanate of formula (XIII) 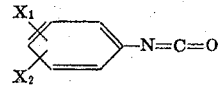

wherein $X_1$ and $X_2$ have the significance mentioned. The process is advantageously carried out in an inert organic solvent and with the addition of a base such as for example triethylamine.

The N-hydroxyphenyl-N'-phenylureas of Formulas (I) to (XI) can be used for combatting harmful micro-organisms, especially bacteria, and using these ureas materials for combatting harmful micro-organisms can be manufactured and employed in a manner which is in itself known. A particularly valuable feature of the new materials is the broad anti-bacterial action spectrum which extends both to gram-positive and gram-negative bacteria. In this context the absence of odor and color of the ureas is of particular value from the point of view of the technique of use. The present invention thus also comprises their use in combatting pests quite generally. They can be used on a very broad basis, especially for protecting organic substrates against attack by destructive and pathogenic (including phytopathogenic) micro-organisms. The compounds of Formula (I) are accordingly suitable for use both as preservatives and as disinfectants for textiles and technical products of all kinds, in plant protection, in agriculture, in veterinary medicine and in cosmetics.

Amongst the technical products which can be preserved with the aid of the compounds of Formula (I) the following may be selected as examples: textiles aids or finishing agents, glues, binders, paints, color pastes and printing pastes and similar preparations based on organic and inorganic dyestuffs or pigments, including those which contain casein or other organic compounds as admixtures. Wall and ceiling paints, for example those containing a color binder which contains albumen, are also protected against attack by pests by adding the new compounds. Their use for timber protection is also possible.

The compounds of Formula (I) can furthermore be used for the preservative and disinfectant finishing of fibers and textiles, in which they can be applied to natural and synthetic fibers and there develop a durable action against harmful (including pathogenic) organisms, for example fungi and above all bacteria. The addition can here be effected before, simultaneously with or after a treatment of these textiles with other substances, for example color pastes or printing pastes, finishes and the like.

Textiles treated in this way also show protection against the manifestation of perspiration odor as occasioned by micro-organisms.

The compounds of Formula (I) can also be employed as preservatives in the cellulose and paper industry, inter alia for preventing the known slime formation, caused by micro-organisms, in the apparatus employed for producing paper.

Further, detergents and cleansing agents possessing excellent anti-bacterial and/or anti-mycotic action are obtained by combining the compounds of Formula (I) with detergents and/or surface-active substances. The compounds of Formula (I) can for example be incorporated into soaps, combined with soap-free detergents and/or surface-active substances or combined with mixtures of soaps and soap-free detergent substances, with their anti-microbial effectiveness being fully preserved in these combinations.

Cleansing agents which contain a compound of Formula (I) can be employed in industry and households and also in the foodstuff industry, for example in dairies, breweries and abattoirs. The compounds of Formula (I) can also be employed as a constituent of preparations serving cleansing and/or disinfection purposes in hospitals and medical practice.

The effect can also be utilized in preservative and disinfectant finishes of plastics. When using plasticizers it is advantageous to add the compounds of Formula (I) to the plastic as a solution or dispersion in the plasticizer. It is appropriate to ensure that the compounds should be as uniformly distributed in the plastic as possible. The plastics possessing anti-microbial properties can be used for utensils of all kinds in which an activity against the most diverse germs such as for example bacteria and fungi is desired, such as for example in doormats, bathroom curtains, toilet seats, foot grids in swimming pools and wall coverings. Floor polishes and furniture polishes possessing a disinfectant effect are obtained by incorporating the compounds into wax and polishing compositions.

The compounds of Formula (I) can be applied to textile materials which are to be protected in the most diverse manner, for example by impregnation or spraying with solutions or suspensions which contain the compounds mentioned as the active substance. The content of active substance can herein be between 1 and 30 g of active substance per liter of treatment liquid depending on the end use. In most cases textile materials of either synthetic or natural origin are adequately protected against attack by fungi and especially by bacteria through a content of 0.1 to 3 percent of active substance. The active substance can be employed together with other textile aids such as finishing agents, crease-proofing finishes and the like.

The use forms can correspond to the usual formulations of pesticides; for example, materials containing a compound of Formula (I) can optionally also further contain additives such as carriers, solvents, diluents, dispersing agents, wetting agents or adhesives and the like as well as other pesticides. Finally, several compounds of Formula (I) to (XI) can also be present simultaneously in such materials for combatting harmful micro-organisms.

The parts specified in the examples which follow are parts by weight and the percentages are percentages by weight, unless otherwise specified. The relationship of parts by weight to parts by volume is that of g to ml.

EXAMPLE 1

9.3 parts of 3-hydroxy-4-amino-diphenyl in 50 parts by volume of acetone and 0.1 part by volume of triethylamine are mixed at 20° C. with a solution of 11.1 parts of 4-chloro-3-trifluoromethylphenylisocyanate in 50 parts by volume of acetone. The clear reaction solution is boiled for 2 hours under reflux. 100 parts by volume of chlorobenzene are added and the bulk of the acetone is removed by distillation at normal pressure, after which the urea of formula (1) 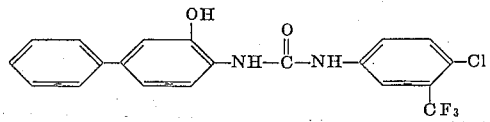

begins to precipitate in a crystalline form even while warm. After cooling to 20° C. the product is filtered off, rinsed with chlorobenzene and dried. The yield is approximately 15 parts; melting point 188.5 to 189° C.

The compounds No. 2 to 60 of Table I and II can be manufactured in an analogous manner, with similar yields.

Table I

| Compound No. | Substituents in formula (I), wherein $Y_2$ and $Y_3$ = H ||||| Melting Point in °C |
|---|---|---|---|---|---|---|
| | $X_1$ (position) | | $X_2$ (position) | | $Y_1$ (position) | |
| 1 | Cl | (4') | $-CF_3$ | (3') | —C$_6$H$_5$ (4) | 188.5 – 189 |
| 2 | H | | Cl | (4') | $-CH_3$ (4) | 216 – 217 |
| 3 | Cl | (4') | Cl | (3') | $-CH_3$ (4) | 208.5 – 209.5 |
| 4 | Cl | (4') | Cl | (3') | $-C(CH_3)_3$ (5) | 194 – 194.5 |
| 5 | Cl | (4') | Cl | (3') | $-C(CH_3)_2-CH_2-C(CH_3)_2-CH_3$ (5) | 175 – 176 |
| 6 | Cl | (4') | Cl | (3') | $-(CH_2)_8-CH_3$ (5) | 136.5 – 137.5 |

| Compound No. | Substituents in formula (I), wherein $Y_2$ and $Y_3$ = H | | | | Melting Point in °C |
|---|---|---|---|---|---|
| | $X_1$ (position) | $X_2$ (position) | $Y_1$ (position) | | |
| 7 | Cl (4') | Cl (3') | $-(CH_2)_{11}-CH_3$ | (5) | 114.5 – 115.5 |
| 8 | Cl (4') | Cl (3') |  | (5) | 197.5 – 198.5 |
| 9 | Cl (4') | Cl (3') |  | (4) | 206 – 207 |
| 10 | Cl (4') | Cl (3') | 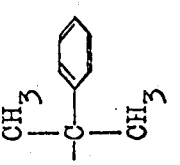 | (5) | 177 – 178 |
| 11 | Cl (4') | Cl (3') | $-CF_3$ | (5) | 194 – 195 |

Substituents in formula (I), wherein $Y_2$ and $Y_3$ = H

| Compound No. | $X_1$ (position) | $X_2$ (position) | | $Y_1$ (position) | | Melting point in °C |
|---|---|---|---|---|---|---|
| 12 | H | Cl | (4') | -C(CH$_3$)$_3$ | (5) | 178 – 179 |
| 13 | H | -CF$_3$ | (3') | -CH$_3$ | (4) | 190 – 191 |
| 14 | H | -CF$_3$ | (3') | -C(CH$_3$)$_3$ | (5) | 178 – 179 |
| 15 | H | -CF$_3$ | (3') | CH$_3$ CH$_3$<br>\|  \|<br>CH$_3$-C-CH$_2$-C-CH$_3$<br>\|  \|<br>CH$_3$ CH$_3$ | (5) | 107 – 108 |
| 16 | H | -CF$_3$ | (3') | ⬡-H | (5) | 163 – 164 |
| 17 | H | -CF$_3$ | (3') | ⬡ | (4) | 196 – 197 |

| Compound No. | Substituents in formula (I), wherein $Y_2$ and $Y_3$ = H | | | | Melting point in °C |
|---|---|---|---|---|---|
| | $X_1$ (position) | $X_2$ (position) | | $Y_1$ (position) | |
| 18 | H | Cl (4') | | $CH_3\ \ \ CH_3$<br>$\ \ \ \|\ \ \ \ \ \ \ \ \|$<br>$-C-CH_2-C-CH_3$ (5)<br>$\ \ \ \|\ \ \ \ \ \ \ \ \|$<br>$CH_3\ \ \ CH_3$ | 184 – 185 |
| 19 | $-CF_3$ (5') | $-CF_3$ (3') | | $-CH_3$ (4) | 201 – 202 |
| 20 | $-CF_3$ (5') | $-CF_3$ (3') | | $-C(CH_3)_3$ (5) | 176.5 – 177.5 |
| 21 | $-CF_3$ (5') | $-CF_3$ (3') | | $CH_3\ \ \ CH_3$<br>$\ \ \ \|\ \ \ \ \ \ \ \ \|$<br>$-C-CH_2-C-CH_3$ (5)<br>$\ \ \ \|\ \ \ \ \ \ \ \ \|$<br>$CH_3\ \ \ CH_3$ | 145 – 146 |
| 22 | $-CF_3$ (5') | $-CF_3$ (3') | | ⟨H⟩ (5) | 185 – 186 |

| Compound No. | Substituents in formula (I), wherein $Y_2$ and $Y_3$ = H | | | | | | Melting point in °C |
|---|---|---|---|---|---|---|---|
| | $X_1$ (position) | | $X_2$ (position) | | $Y_1$ (position) | | |
| 23 | $-CF_3$ | (5') | $-CF_3$ | (3') | phenyl | (4) | 203.5 – 204.5 |
| 24 | $-CF_3$ | (5') | $-CF_3$ | (3') | $-CF_3$ | (5) | 195.5 – 196 |
| 25 | H | | Cl | (4') | H | (5) | 195 – 196 |
| 26 | Cl | (4') | $-CF_3$ | (3') | $-CH_3$ | (4) | 188.5 – 189 |
| 27 | Cl | (4') | $-CF_3$ | (3') | $-C(CH_3)_3$ | (5) | 181 – 182 |
| 28 | Cl | (4') | $-CF_3$ | (3') | $-C(CH_3)_2-CH_2-C(CH_3)_3$ | (5) | 174 – 175 |

| Compound No. | Substituents in formula (I), wherein $Y_2$ and $Y_3$ = H | | | | Melting point in °C |
|---|---|---|---|---|---|
| | $X_1$ (position) | $X_2$ (position) | $Y_1$ (position) | | |
| 29 | Cl (4') | —CF$_3$ (3') | ⬡—H (5) | | 191 – 192 |
| 30 | Cl (4') | —CF$_3$ (3') | —CF$_3$ (5) | | 188 – 189 |

Substituents in formula (I), wherein $Y_2$ and $Y_3$ = H

| Compound No. | $X_1$ (position) | | $X_2$ (position) | | $Y_1$ (position) | | Melting point in °C |
|---|---|---|---|---|---|---|---|
| 31 | H | | Cl | (4') | $CH_3$ | (5) | 198 – 199 |
| 32 | Cl | (3') | Cl | (4') | $CH_3$ | (5) | 208 – 209 |
| 33 | H | | $CF_3$ | (3') | $CH_3$ | (5) | 203 – 204 |
| 34 | H | | $CF_3$ | (4') | $CH_3$ | (5) | 192 – 193 |
| 35 | $CF_3$ | (5') | $CF_3$ | (3') | $CH_3$ | (5) | 185 – 186 |
| 36 | Cl | (4') | $CF_3$ | (3') | $CH_3$ | (5) | 193 – 194 |
| 37 | H | | H | | $CH_3$ | (5) | 154 – 155 |

| Compound No. | Substituents in formula (I), wherein $Y_2$ and $Y_3$ = H ||||| Melting point in °C |
| --- | --- | --- | --- | --- | --- | --- |
| | $X_1$ (position) | | $X_2$ (position) | | $Y_1$ (position) | |
| 38 | Cl | (4') | Cl | (3') | ⬡ (5) | 196 – 197 |
| 39 | CF$_3$ | (5') | CF$_3$ | (3') | ⬡ (5) | 177 – 178 |
| 40 | H | | Br | (4') | –C(CH$_3$)$_3$ (5) | 167 – 168 |
| 41 | Cl | (4') | Cl | (3') | –OCH$_3$ (5) | 192 – 193 |
| 42 | H | | H | | –CH$_3$ (4) | 187 – 188 |
| 43 | H | | H | | –C(CH$_3$)$_3$ (5) | 153 – 154 |
| 44 | H | | Cl | (4') | ⬡ (4) | 214.5 – 215 |
| 45 | H | | Cl | (4') | –C(CH$_3$)$_2$–⬡ (5) | 181 – 182 |

Substituents in formula (I), wherein $Y_2$ and $Y_3$ = H

| Compound No. | $X_1$ (position) | $X_2$ (position) | $Y_1$ (position) | Melting point in °C |
|---|---|---|---|---|
| 46 | H | $CF_3$ (4') | phenyl (4) | 214 – 215 |
| 47 | H | $CF_3$ (3') | $-CH(CH_3)_2$ (5) | 144 – 145 |
| 48 | H | $CF_3$ (3') | phenyl (5) | 156 – 157 |
| 49 | $CF_3$ (5') | $CF_3$ (3') | $-CH(CH_3)_2$ (5) | 181 – 182 |
| 50 | $CF_3$ (5') | $CF_3$ (3') | $-C(CH_3)_2$-phenyl (5) | 177 – 178 |

| Compound No. | Substituents in formula (I), wherein $Y_2$ and $Y_3$ = H | | | | | Melting point in °C |
|---|---|---|---|---|---|---|
| | $X_1$ (position) | | $X_2$ (position) | | $Y_1$ (position) | |
| 51 | Cl | (4') | $CF_3$ | (3') | 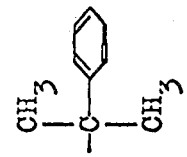 (5) | 175 – 176 |
| 52 | Cl | (3') | $CF_3$ | (4') | $-C(CH_3)_3$ (5) | 167 – 168 |

TABLE II

| Compound No. | Substituents in formula I | | | | | | Melting point in °C |
|---|---|---|---|---|---|---|---|
| | $X_1$ (position) | $X_2$ (position) | $Y_1$ (position) | $Y_2$ (position) | $Y_3$ (position) | | |
| 53 | Cl (4') | Cl (3') | $-C(CH_3)_3$ (3) | $-C(CH_3)_3$ (5) | $-CH_3$ (6) | | 194 – 195 |
| 54 | H | Cl (4') | $-CH_3$ (4) | $-CH_3$ (5) | H | | 207 – 208 |
| 55 | Cl (4') | Cl (3') | $-CH_3$ (4) | $-CH_3$ (5) | H | | 214 – 215 |
| 56 | H | $CF_3$ (3') | $-CH_3$ (4) | $-CH_3$ (5) | H | | 182 – 183 |
| 57 | $CF_3$ (5') | $CF_3$ (3') | $-CH_3$ (4) | $-CH_3$ (5) | H | | 203 – 204 |
| 58 | Cl (3') | $CF_3$ (4') | $-CH_3$ (4) | $-CH_3$ (5) | H | | 179 – 180 |
| 59 | H | H | $-CH_3$ (4) | $-CH_3$ (5) | H | | 161 – 162 |
| 60 | H | Cl (4') | $-C(CH_3)_3$ (3) | $-CH_3$ (5) | H | | 192 – 193 |

EXAMPLE 2

Determination of the Minimal Inhibitory Concentration (MIC) Against Bacteria.

The determination of the MIC (minimal inhibitory concentration) takes place according to a test derived from standard specifications, which permits an approximation to absolute minimal inhibitory values of an active substance.

An 0.4 percent strength solution and an 0.12 percent strength solution in dimethylsulphoxide are manufactured with the active substances. 0.25 ml of the solutions in each case are added to 9.75 ml of sterile Brain Heart Infusion Broth. These two series obtained by progressive dilution, in each case 10-fold, are combined and thereby converted to the following continuous dilution series:

100, 30, 10, 3, 1 ... ppm of active substance.

The solutions are inoculated with the bacterium Staphylococcus aureus. Thereafter incubation is carried out for 48 hours at 37° C.

After the time mentioned, the minimal inhibitory values (ppm) of Table III are found.

TABLE III

| Compound No. | Inhibitory values (ppm) against Staphylococcus aureus |
|---|---|
| 1 | 0.1 |
| 4 | 10 |
| 5 | 1 |
| 6 | 0.3 |
| 7 | 10 |
| 8 | 10 |
| 14 | 1 |
| 15 | 0.3 |
| 16 | 1 |
| 18 | 1 |
| 19 | 0.3 |
| 20 | 0.1 |
| 21 | 1 |
| 22 | 0.3 |
| 23 | 0.3 |
| 24 | 10 |
| 25 | 10 |
| 26 | 1 |
| 27 | 0.3 |
| 28 | 1 |
| 29 | 0.3 |
| 30 | 1 |

EXAMPLE 3

Determination of the Minimal Inhibitory Concentration (MIC) Against Bacteria and Fungi in the Gradient Plate Test [1] [2] [1] W. Szybalski et al., Science 116, 26 (1952). [2] Nuesch and Knuesel "Sideromycins," in the book by Gottlieb and Shaw "Antibiotics, Mechanism of Action," Vol. 1 (1967), Springer Publishers.

The compounds of Formula (I), in suitable formulations (for example as solutions in dimethylsulphoxide) of a certain concentration, are mixed with warm Brain Heart Infusion Agar (bacteria) or Micophil Agar (fungi) respectively. The liquid mixtures are cast onto a solidified wedge-shape base agar layer and also allowed to solidify.

The test organisms are now applied by means of a Pasteur pipette as a line at right angles to the gradient. After an incubation of 24 hours at 37° C. (bacteria) or 72 hours at 30° C. (fungi) respectively the length of the germs which have grown on the inoculation line are measured and expressed in ppm of active substance.

TABLE IV

| Compound No. | Minimal inhibitory concentration (ppm) | | |
|---|---|---|---|
| | Staphylococcus aureus | Trichophyton mentagrophytes | Trichophyton rubrum |
| 1 | 0.1 | 1 | 2.5 |
| 4 | 0.4 | 10 | 3 |
| 5 | 0.2 | 10 | |
| 6 | 0.15 | | |
| 7 | 1 | | |
| 8 | 2 | 2 | |
| 9 | 0.4 | 2 | |
| 10 | 0.1 | 1 | 10 |
| 11 | 2.5 | 2 | |
| 12 | 2 | | |
| 14 | 1 | 4 | 10 |
| 15 | 0.15 | | |
| 16 | 0.35 | 2 | 3 |
| 17 | 0.6 | 1 | 1 |
| 18 | 0.2 | 1 | 1.5 |
| 19 | 0.2 | 2 | 3 |
| 20 | 0.03 | 4 | 5 |
| 21 | 0.15 | | |
| 22 | 0.1 | 10 | 10 |
| 23 | 0.1 | 1 | 10 |
| 24 | 1.5 | 2 | 10 |

TABLE IV

| Compound No. | Minimal inhibitory concentration (ppm) | | |
|---|---|---|---|
| | Staphylococcus aureus | Trichophyton mentagrophytes | Trichophyton rubrum |
| 26 | 0.15 | 2.5 | 35 |
| 27 | 0.15 | 1 | 10 |
| 28 | 0.2 | | |
| 29 | 0.1 | 1 | 3 |
| 30 | 1 | 3 | 6 |
| 34 | 3 | | |
| 35 | 0.2 | | |
| 36 | 0.1 | | |
| 39 | 1 | | |
| 41 | 3 | | |
| 45 | 0.4 | | |
| 46 | 0.3 | | |
| 47 | 2 | 3 | |
| 48 | 0.35 | | |
| 49 | 0.1 | | |
| 50 | 0.1 | | |
| 51 | 0.1 | | |
| 52 | 0.1 | 1 | |
| 55 | 0.04 | | |
| 57 | 0.4 | | |
| 58 | 0.5 | | |
| 60 | 0.03 | 2.5 | |

TABLE IV

| Compound No. | Minimal inhibitory concentration (ppm) | |
|---|---|---|
| | Epidermophyton floccosum | Microsporum gypseum |
| 1 | 10 | |
| 4 | 10 | |
| 17 | 3 | 1 |
| 24 | 20 | 15 |
| 26 | 10 | 10 |
| 30 | 20 | 20 |

EXAMPLE 4

In order to manufacture an anti-microbial soap cake, 2.4 g of one of the compounds of Formula I are added to the following mixture: 120 g of base soap in the form of flakes, 0.12 g of the disodium salt of ethylene diamine tetraacetic acid (dihydrate) and 0.24 g of titanium dioxide.

The soap chips obtained by milling are pulverized by means of a rapid stirrer and subsequently pressed into cakes of soap.

Warm Brain Heart Infusion Agar is mixed with concentrated aqueous solutions of the anti-microbial soaps in such a way that incorporation dilution series containing 0.1, 0.2, 0.4, 0.6, 0.8, 1.0 etc. ppm of active substance are produced. The warm mixtures are cast into Petri dishes, allowed to solidify and subsequently inoculated with Staphylococcus aureus.

After 24 hours' incubation at 37° C. the minimal inhibitory concentration is determined.

TABLE V

| Compound No. | Minimal inhibitory concentration of the anti-microbial soaps in ppm of active substance |
|---|---|
| 4 | 0.2 |
| 9 | 0.6 |
| 10 | 0.2 |
| 18 | 0.2 |
| 20 | 0.2 |
| 27 | 0.2 |

EXAMPLE 5

Substantivity Test with Calfskin Discs

Calfskin discs of 1 cm diameter are dipped for 2 minutes in 8 percent strength aqueous solutions of the anti-microbial soaps manufactured according to example 4. After 3 minutes rinsing in running water the discs are laid on Brain Heart Infusion Agar plates which are beforehand inoculated with Staphylococcus aureus. Thereafter incubation is carried out for 20 hours at 37° C.

The inhibitory zone arising around the calfskin discs (IZ in mm) on the one hand, and the microscopically detectable growth (G in percent) underneath and/or on the discs on the other, are assessed.

TABLE VI

| Soap with Compound No. | IZ in mm | G in % |
|---|---|---|
| 4 | 0 | 0 |
| 20 | 0 | 0 |
| 27 | 0 | 0 |

EXAMPLE 6

Sterile cotton discs ( 3.0 g) of 4 cm diameter are each inoculated with 0.1 ml of a suspension of Staphylococcus aureus containing 50 percent of sterile cattle serum and $10^5$ germs/ml and dried for 1 hour at 37° C. They are then washed for 15 minutes at 45° C. in a laboratory washing machine, using a liquor ratio of 1:20, with 4 g per liter of a detergent based on dodecylbenzenesulphonate containing 1 percent of compounds 20 and 23. Thereafter the discs are rinsed for 15 minutes, using the same liquor ratio, at 45° C. and 3 times for 5 minutes at a time at 20° C. The woven fabric discs are then surface-dried between sterile filter paper. The curative effect is determined as follows:

The discs are layed on agar plates (Brain Heart Infusion Agar) and incubated for 44 hours at 37° C. After this time no growth of Staphylococcus aureus can be detected.

If instead of cotton discs nylon discs are used, similar curative effects are obtained.

Germ count of the wash water:

0.1 ml of the wash water is plated out on agar plates (Brain Heart Infusion Agar). After an incubation of 44 hours at 37° C. no growth of Staphylococcus can be observed.

We claim:

1. The compound of the formula

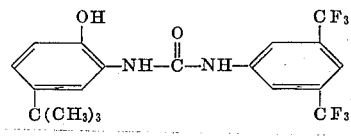

2. The compound of the formula

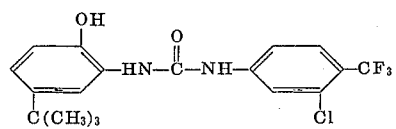

3. The compound of the formula

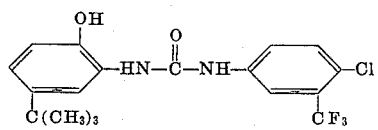

* * * * *